Nov. 29, 1960    M. C. HESSE    2,961,998
CATTLE OILER
Filed Aug. 27, 1958    2 Sheets-Sheet 1
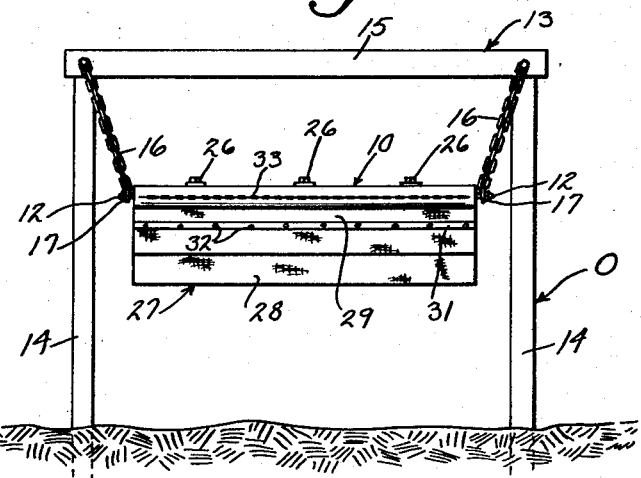
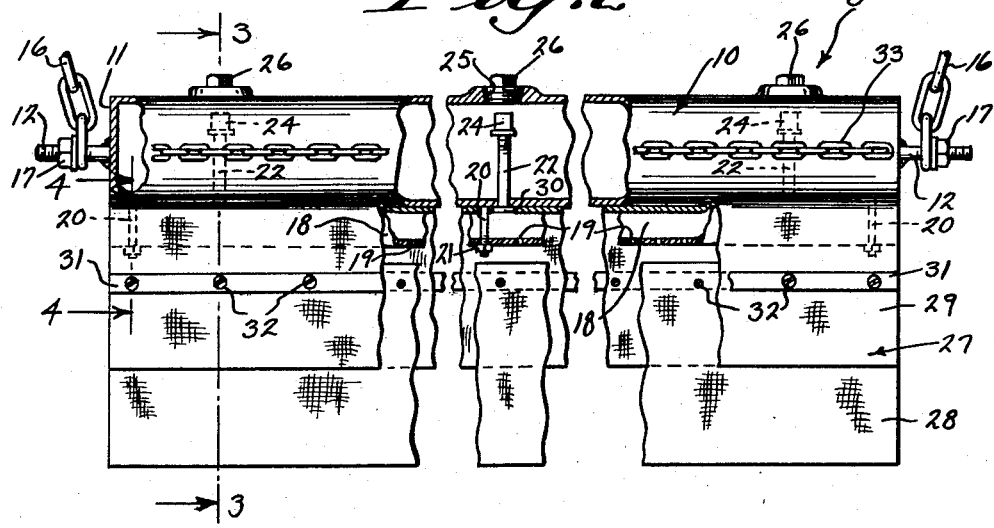
INVENTOR
MYRON C. HESSE
BY *Wright and Wright*
ATTORNEYS Nov. 29, 1960 M. C. HESSE 2,961,998
CATTLE OILER
Filed Aug. 27, 1958 2 Sheets-Sheet 2
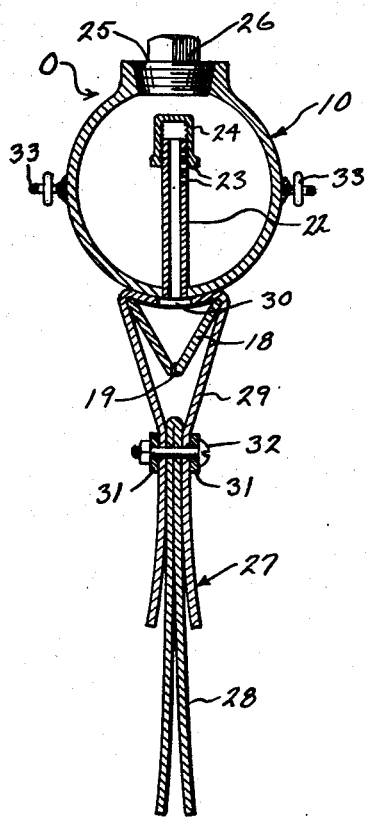
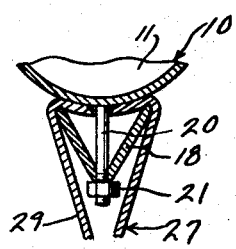
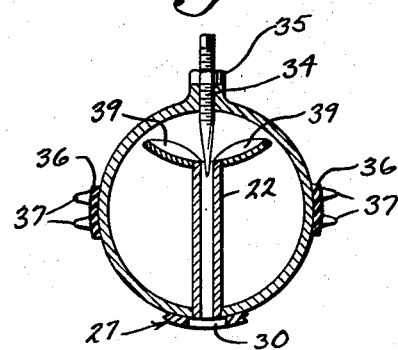
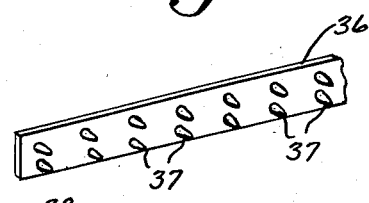
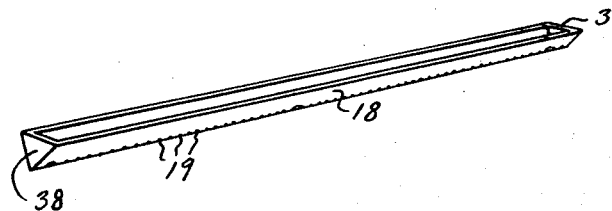
INVENTOR
MYRON C. HESSE
BY *Wright and Wright*
ATTORNEYS

United States Patent Office 2,961,998
Patented Nov. 29, 1960

2,961,998

CATTLE OILER

Myron C. Hesse, Pender, Nebr.

Filed Aug. 27, 1958, Ser. No. 757,486

6 Claims. (Cl. 119—157)

This invention appertains to animal oilers and more particularly to means for applying a liquid such as oil or insecticide, or a combination of both, to the hides of insect infested livestock, the liquid being applied to the animals themselves rubbing against an applicator.

One of the primary objects of my invention is to provide an oil rubbing station for livestock of the type embodying a rolling reservoir tank for oil and a depending fabric wiping apron carried thereby, with novel means for feeding a quantity of oil or the like evenly throughout the length of the apron from the tank each time an animal passes under and rubs against the apron to cause a turning or tilting of the tank.

Another salient object of my invention is the provision of novel means for supporting the apron, whereby the same can be quickly and easily replaced when wear takes place thereon.

A further object of my invention is the provision of an oil distributing trough secured to the tank and supporting depending flexible flaps to which in turn is detachably secured the applicator apron, the trough receiving the liquid from the tank upon the tilting thereof, the trough having a row of spaced openings extending its full length to evenly distribute the oil to the apron.

Another further object of the invention is the provision of easily accessible means for adjustably regulating the flow of oil from the tank to the trough.

A still further important object of my invention is the provision of scoops carried by the oil feeding means from the tank to the trough for insuring a supply of oil to said means when the oil in the tank reaches a low level.

A still further important object of my invention is the provision of a back scratcher for the animals carried by the tank, so as to insure the distribution of the oil into the hair of the animals and so as to render the device attractive to animals and to aid in the turning of the tank by the animals.

With these and other objects in view, the invention consists in the novel construction, arrangement and formation of parts, as will be hereinafter more specifically described and claimed, and illustrated in the accompanying drawings, in which drawings, Figure 1 is a front elevational view of my improved cattle oiler;

Figure 2 is an enlarged front elevation of the oil reservoir tank and the applicator apron, parts of the tank and apron being shown broken away and in section to illustrate structural detail;

Figure 3 is a transverse sectional view through the reservoir tank and apron taken on the line 3—3 of Figure 2, looking in the direction of the arrows;

Figure 4 is a fragmentary detail transverse sectional view taken on the line 4—4 of Figure 2, looking in the direction of the arrows and illustrating the means for securing the trough to the tank and the flexible flaps to the trough and tank;

Figure 5 is a transverse sectional view through the tank illustrating a modified form of my invention;

Figure 6 is a fragmentary detail perspective view of a modified form of the back scratcher, and Figure 7 is a detail perspective view of a modified form of trough.

Referring to the drawings in detail, wherein similar reference characters designate corresponding parts throughout the several views, the letter O generally indicates my improved oiler for livestock and the same includes a horizontally disposed reservoir tank 10. The tank is preferably cylindrical in shape for a purpose, which will later appear. Welded or otherwise secured to the axial centers of the end walls 11 of the tank, are stub shafts 12. The outer ends of these stub shafts are preferably threaded.

The tank 10 is freely suspended from its stub shafts from a suitable frame 13. The frame 13 can include spaced uprights or posts 14 and the upper terminals of the posts have rigidly secured thereto a cross-beam 15.

Secured to the upper corners of the frame 13 are depending chains 16 and the lowermost links of the chains are passed over the stub shafts 12. Nuts 17 can be threaded on the stub shafts to prevent accidental displacement of the chains 16 from the stub shafts. The stub shafts and consequently the reservoir tank 10 is free to rotate in the chains and the tank is free to swing with the chains.

Disposed below the tank 10 and extending the full length thereof is an oil distributing trough 18. This trough is preferably formed from angle iron for the sake of simplicity and cost and this trough at its apex is provided with a row of spaced oil drip openings 19. The trough is so disposed that the flanges or side walls thereof extend uppermost with its angle and openings 19 lowermost. A plurality of depending studs 20 are welded or otherwise secured to the bottom of the tank and these studs extend through openings in the trough. Nuts 21 are threaded on the studs tight against the lower edge of the trough for drawing the upper edges of the trough against the bottom of the tank.

The trough 18 is also utilized for another purpose, which will be later set forth.

Means is provided for feeding oil from the tank to the trough each time the tank is turned on or rocked with the chains 16. This means includes a plurality of normally vertical feed tubes 22. The feed tubes 22 are open at their opposite ends and the lower ends of the tubes extend through the bottom of the reservoir tank 10 and these ends can be welded or otherwise secured in place. The upper ends of the tubes terminate short of the top of the reservoir tank and the upper ends of the tubes are adapted to receive oil from the tank as the tank is turned or rotated.

Adjustable means is provided for regulating the flow of oil into the tubes. As best shown in Figures 2 and 3 the upper ends of the tubes are provided with a row of vertically spaced oil inlet openings 23. Caps 24 are threaded on the upper ends of the tubes. By threading the caps up or down, more or less of the openings 23 can be uncovered. Obviously, if more of the holes 23 are uncovered, a greater quantity of oil will flow into the tubes.

The tank itself above the tubes is provided with filling openings 25 and these openings can be closed by plugs 26. The plugs 26 can also be removed to permit access to be had to the interior of the tank to adjust the caps 24.

As heretofore brought out, the trough 18 also serves another purpose besides that of receiving the oil from the tank and for distributing the oil. Thus, the trough is also utilized for holding and properly supporting the wiping or applicator apron 27. The apron is formed from flexible material and preferably from a fabric, such as canvas, which will readily absorb and distribute oil. The apron 27 includes a lower applicator section 28 and an upper flap section 29. Prior to the securing of the trough 18 in place, the upper flap section 29 is draped over the trough 18 so as to enclose the trough, after which the studs 20 are passed through the flap and through the trough as heretofore stated. The upper section 29 can be cut away if so desired adjacent to the outlets of the tubes 22, as shown at 30 in Figure 3 of the drawings. The upper section 29 depends from the trough 18 and the lower applicator section 28 is secured to the side flaps of the upper section 29 by means which will now be described. The lower section 28 is preferably formed by folding the fabric upon itself and the folded portion is inserted between the side flaps of the upper section 29. Pieces of strap iron 31 are placed on opposite sides of the flap portions of the upper section and bolts 32 are passed through the strap irons or plates 31, through the flaps of the upper section 29 and through the folded portion of the lower section 28. The bolts can be tightened to a desired degree and the plates or strap irons 31 function to not only hold the mentioned parts together but to also compress the fabric so that the oil flowing from the trough will be somewhat confined by the plates and thus allow the oil to be evenly distributed throughout the length of the applicator. Obviously, the trough 18 also serves as a means for evenly distributing the oil from the tank to the applicator.

In use of the oiler, the animals walk under the applicator and the applicator conforms somewhat to the roundness of an animal's back and as the animal continues walking the tank is tilted or rolled and a supply of oil is taken in by the tubes 22 and such oil will flow into the trough 18.

As the greatest wear takes place on the lower portion 28 of the applicator, this is the part that has to be replaced most often and this is easily done by removing the strap irons or plates 31 with the bolts 32. Thus, it is unnecessary to replace the entire applicator at frequent intervals.

To render the apparatus more attractive to animals, the opposite sides of the tank have welded thereto at spaced points, chains 33 and these chains act as animal scratchers during the tilting of the tank. The animals have a natural tendency to rub against the chains and the tank itself rocks back and forth. As best shown in Figures 1 and 2, the chains 33 extend substantially the full length of the tank.

Various modifications can be made to the oiler and different types of means can be used to regulate the flow of oil into the tubes 22. As shown in Figure 5, needle valves 34 are threaded into the tank and into the upper ends of the feed tubes 22. By adjusting the points of the needle valves in the tubes, the amount of oil flowing in the tubes can be controlled. After the valves have been adjusted the same can be held against accidental turning movement by lock nuts 35. In lieu of utilizing chain scrapers I can employ longitudinally extending strips of rubber or the like 36 (see Figs. 5 and 6). These strips can be cemented or otherwise secured to the opposite sides of the tank and these strips carry a plurality of flexible nipples 37.

Under ordinary conditions the ends of the trough are left open, but as shown in Figure 7, the ends of the trough can be closed by end walls 38.

In some instances, when the supply of oil in the reservoir tank gets low, it is desirable to provide means for scooping up oil as the oil runs back and forth in the tank during the tilting thereof. As shown in Figure 5, the upper ends of the tubes 22 can carry spoons or scoops 39 and upon the picking up of oil by the scoops or spoons the oil will be fed into the upper ends of the tubes when the tubes reach an upright position.

The outer surface of the reservoir tank 10 can be treated in various manners to resist the elements and can be painted with a light reflecting surface to prevent the overheating of the oil.

From the foregoing description it can be seen that I have provided an effective oiling station for livestock which is of an exceptionally durable construction and which can be placed upon the market at a low cost.

Changes in details may be made without departing from the spirit or the scope of this invention, but what I claim as new is:

1. In an oiling and rubbing station for animals, an elongated horizontally disposed tank, a flexible applicator extending substantially the full length of the tank, a liquid distributing trough inserted in said applicator, means securing the trough to the bottom of said tank and said trough forming a clamp for securing the applicator in place between itself and the tank, said trough having a plurality of spaced outlet openings throughout its length for evenly supplying liquid to the applicator, and means for supplying liquid from the tank to the trough.

2. An oiling and rubbing station for animals as defined in claim 1, and said last named means including open ended tubes extending into the tank and communicating at their lower ends with the trough, the upper ends of said tubes terminating in said tank, and means for regulating the flow of liquid into the tubes from the tank.

3. An oiling and rubbing station for animals as defined in claim 2, and scoops carried by the upper ends of the tubes for picking up liquid from the tank upon the rolling and titlting thereof and for directing said picked up liquid into the tubes.

4. In a rubbing and oiling station for animals, a horizontally disposed elongated reservoir tank for liquid, a trough carried by and abutting the bottom of said tank and extending the full length of said tank having a plurality of outlet openings formed therein throughout its length, a flexible applicator against which the animals are adapted to rub suspending from the tank and said trough, means for supplying liquid from the tank to the trough, the applicator extending the full length of the trough and adapted to receive liquid from the trough through said openings, and said applicator including a lower flexible apron section and an upper folded distributor section said upper folded distributor section receiving and enclosing said trough, and means for securing the upper and lower applicator sections together.

5. In an oiling and rubbing station for animals as defined in claim 4, and said securing means for said applicator sections including longitudinally extending clamping bars engaging the opposite faces of the applicator, and means for drawing said clamping bars into compressing engagement with the upper and lower sections, said clamping bars also constituting liquid collecting and distributing means for the applicator throughout its length.

6. A rubbing and oiling station for animals comprising an overhead support, a horizontally disposed elongated reservoir tank for liquid freely suspended from said overhead support for rolling and tilting movement, a liquid distributing conduit in liquid receiving relationship with the tank and rigidly carried by the bottom of sad tank for movement therewith and extending substantially the full length of the tank and having a plurality of outlet openings therein through its length, a flexible applicator against which the animals are adapted to rub surrounding said conduit and depending therefrom for movement therewith and for receiving liquid therefrom through the openings, and adjustable means in the tank supplying liquid to the conduit upon the rolling and tilting movement of the tank.

References Cited in the file of this patent

UNITED STATES PATENTS

| 987,433 | Crawford | Mar. 21, 1911 |
| 1,382,066 | Curran | June 21, 1921 |
| 2,372,544 | Borman et al. | Mar. 27, 1945 |
| 2,702,020 | Worden | Feb. 15, 1955 |
| 2,711,722 | Gray | June 28, 1955 |